A. BARR & W. STROUD.
INDICATING OR ESTIMATING MECHANISM FOR ORDNANCE.
APPLICATION FILED MAY 8, 1911.
1,050,512.
Patented Jan. 14, 1913.
4 SHEETS—SHEET 1.
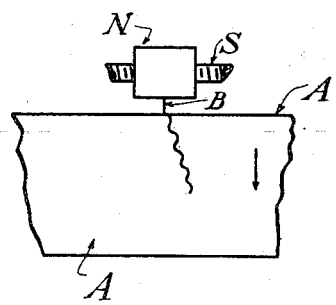
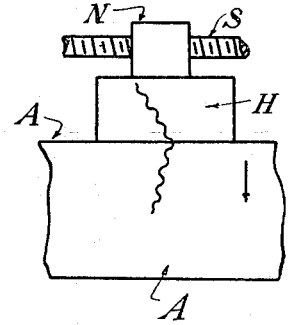
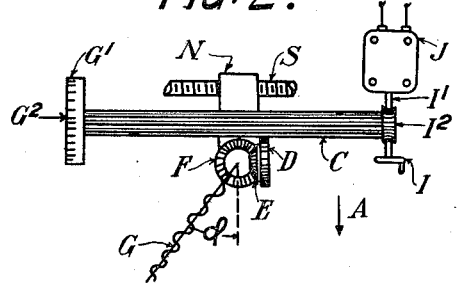
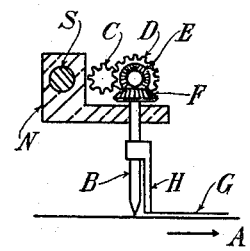
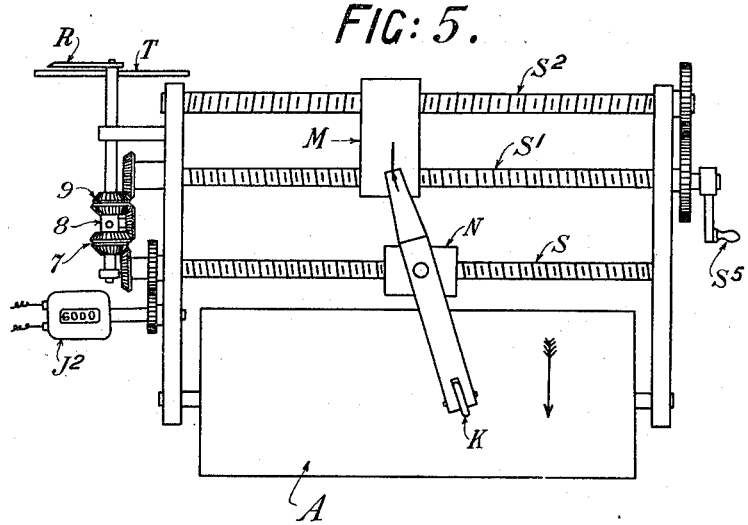
Witnesses
Chas H Smith
A L Serrell
Inventors
Archibald Barr.
William Stroud.
by Harold Serrell
their Atty.

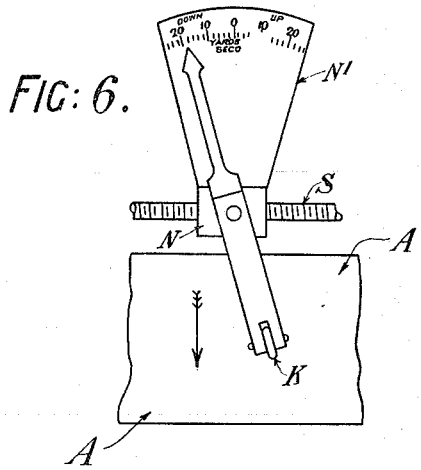
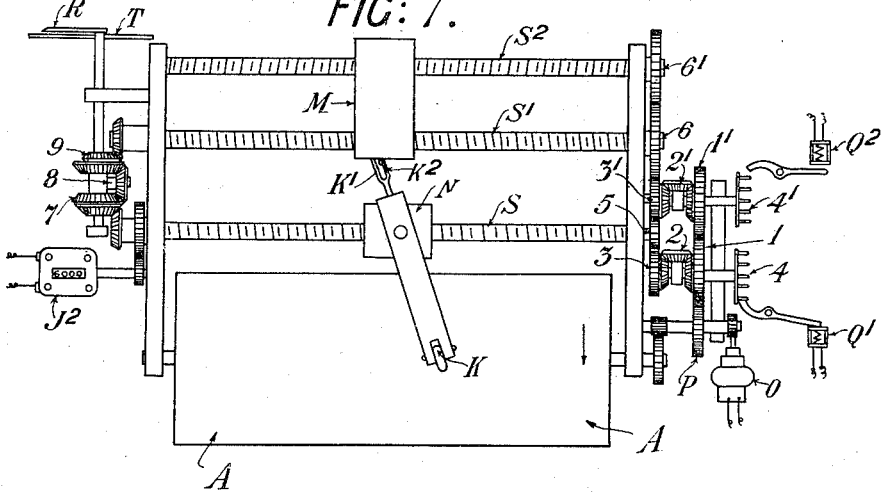
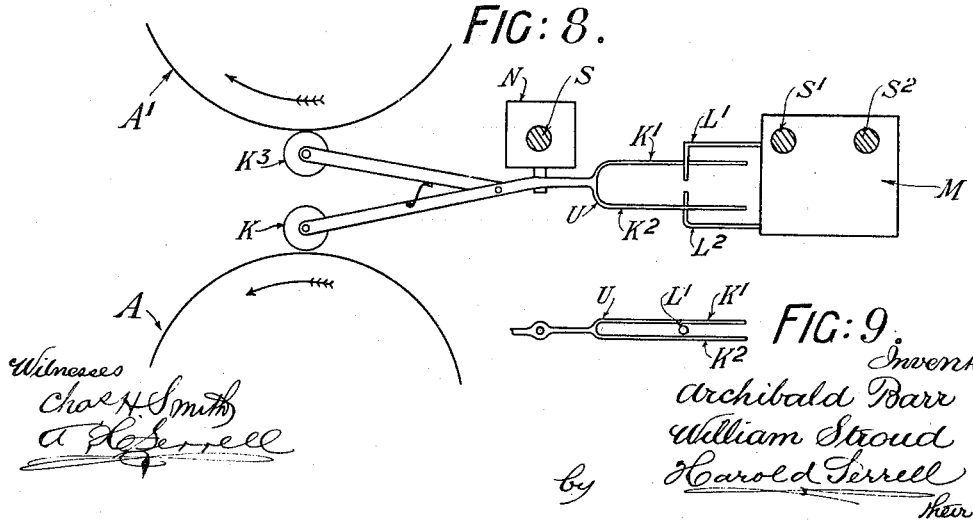

A. BARR & W. STROUD.
INDICATING OR ESTIMATING MECHANISM FOR ORDNANCE.
APPLICATION FILED MAY 8, 1911.
1,050,512.
Patented Jan. 14, 1913.
4 SHEETS—SHEET 3.
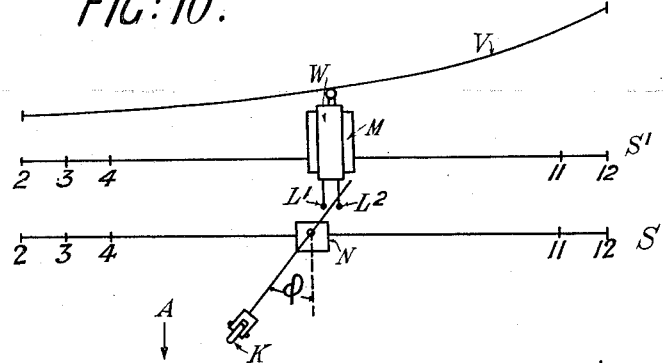
FIG: 10.
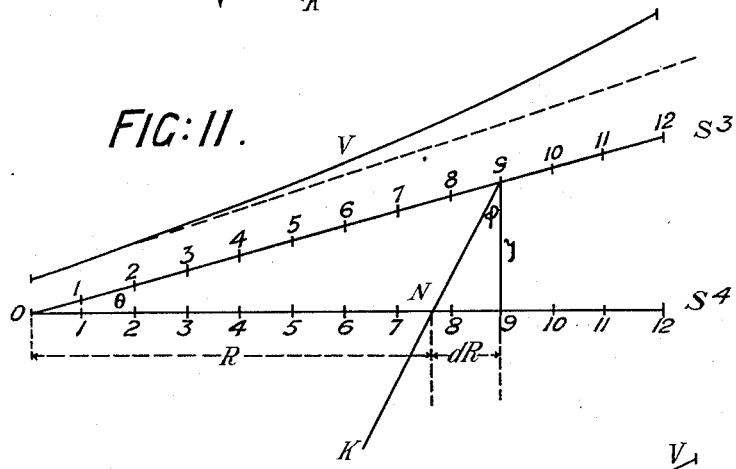
FIG: 11.
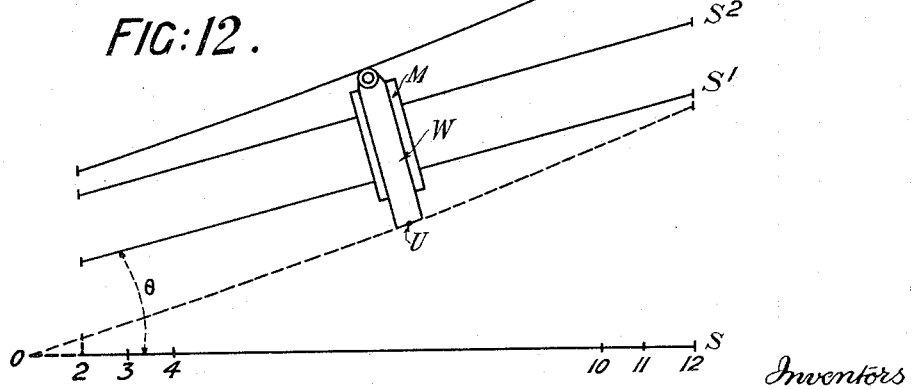
FIG: 12.

FIG: 13.
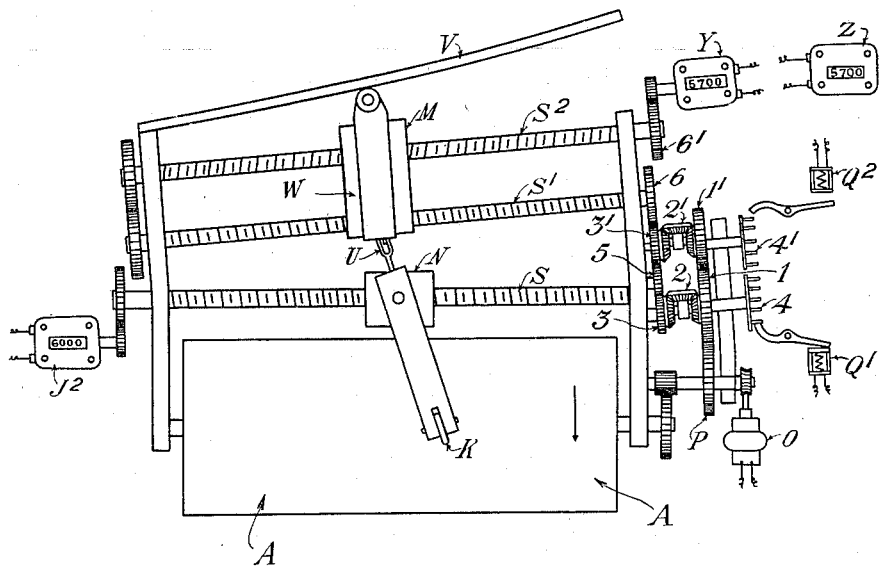
FIG: 14.
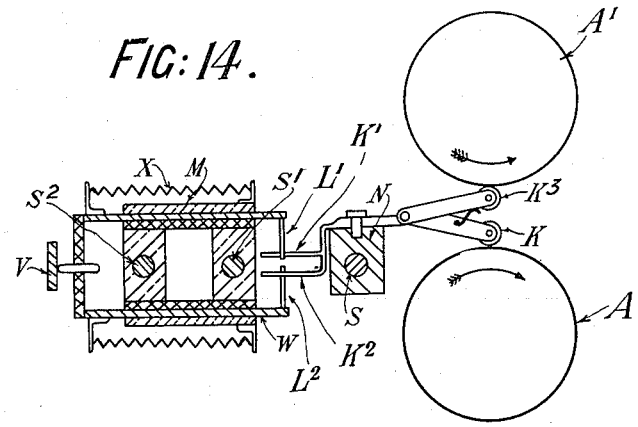

UNITED STATES PATENT OFFICE.

ARCHIBALD BARR AND WILLIAM STROUD, OF GLASGOW, SCOTLAND.

INDICATING OR ESTIMATING MECHANISM FOR ORDNANCE.

1,050,512. Specification of Letters Patent. Patented Jan. 14, 1913.

Application filed May 8, 1911. Serial No. 625,911.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented Indicating or Estimating Mechanism for Ordnance, (for which we have made application for a patent in Great Britain, No. 15,480, bearing date June 28, 1910,) of which the following is a specification.

The object of this invention is to provide mechanism for use in ascertaining or for automatically indicating the rate of change of a variable quantity, and further, to provide mechanism for use in estimating or for automatically indicating the value in the near future of a function of a type varying uniformly (or nearly so) with lapse of time, the invention being particularly adapted for ascertaining the rate of change of range or bearing of a target, and for determining the range and deflection to which a gun sight must be set in order that the shot may hit the target when the target and gun have a relative motion.

Mechanism according to this invention for use in ascertaining or for automatically indicating the rate of change of a variable quantity, comprises a traveling surface moving at a uniform rate normally in one direction in combination with a member, associated with means for imparting a relative motion between the member and the traveling surface transversely to the normal direction of travel of the traveling surface in conformity with changes in the value of the variable quantity, the member being furnished with deviation indicating means adapted to produce an indication or to assume a position upon the traveling surface, the angular deviation of which from the normal direction of travel of the surface shows the ratio of the normal velocity of the traveling surface and the relative transverse velocity, and is an indication of the rate of change; and mechanism according to this invention for use in estimating or for automatically indicating the value in the near future of a function of a uniformly (or nearly uniformly) variable type, consists of mechanism for indicating the rate of change of the variable quantity, associated with apparatus or modified in construction to produce the result to be predicted.

Some examples of the construction of mechanisms according to this invention will now be described with reference to the accompanying drawings, in which:—

Figure 1 is a front view of apparatus for use in determining the rate of change of a variable quantity. Fig. 2 is a plan, and Fig. 3 is an end elevation of apparatus as shown at Fig. 1, comprising means for hand adjustment in estimating the rate of change. Fig. 4 shows diagrammatically how in some cases a mirror may be used for indicating the rate of change of the variable quantity (say, the range or bearing of a moving target). Fig. 5 is a plan of apparatus for indicating the rate of change by hand adjustment, and Fig. 6 shows an automatic arrangement for showing such rate of change. Fig. 7 is a plan of apparatus for automatically indicating in a modified way the rate of change of a variable quantity. Fig. 8 is a side elevation and Fig. 9 is a plan of part of Fig. 8, illustrating a trailer and associated parts to be described. Fig. 10 is a diagram explanatory of one method of range prediction. Figs. 11 and 12 are diagrams explanatory of a modified method of range prediction. Fig. 13 is a plan and Fig. 14 is an end sectional view of a part of Fig. 13, illustrating apparatus for predicting ranges according to the method shown at Figs. 11 and 12.

The mechanisms to be described with reference to the drawings will generally be referred to as dealing with ranges, but it is to be understood that apparatus embodying similar modes of operation may be used in connection with other variable quantities.

In the drawings the traveling surface is represented as consisting of the periphery of a slowly rotating drum A, and the member adapted to be moved transversely to the direction of travel of the surface is represented as consisting of a nut N mounted upon a screw S set parallel to the axis of the drum. In the examples of construction to be described it will be assumed that the screw S is to be rotated in conformity with observed changes of range, for example, by the screw S being geared to a receiver to which ranges are transmitted by hand from a range transmitter, which, if required, may be geared directly to the operating mechanism of a rangefinder and the transmitter may be designed either to transmit by equal steps, equal differences in ranges, or, equal differences in parallax. It will also be assumed that the nut N travels to the right as the range increases.

An example of means for use in ascertaining the rate of change of range is shown at Fig. 1 in which the nut N is furnished with a deviation indicator consisting of a pencil B arranged to bear upon the drum A, so that if the range remains constant a line will be traced upon the drum perpendicular to the axis of the drum. If the range is gradually changing the line will no longer be perpendicular to this axis, and its deviation from perpendicularity is an indication of the rate of change of range. If observations are being continuously transmitted from the rangefinder, since there will be slight errors in taking the readings, the result will be to produce a wavy line upon the surface of the drum as shown. The general trend of this line will form a means of measuring the rate of change of range. In order to readily estimate this general trend we may provide, in one example of construction as shown at Fig. 2, a rod G mounted upon a center coincident with the point of the pencil B and adjust this rod by hand until it occupies such a position that half of the wavy line lies on one side of it, and half on the other. This rod may be adjusted by bevel gear F upon the axle of which the pencil is mounted in gear with a bevel wheel E axially connected to a toothed wheel D, the latter in gear with a long pinion C (placed parallel to the screws) so that the rod may be adjusted at any position of the nut without interfering with the freedom of the latter upon its screw. For rotating the long pinion C, a gear such as shown at Fig. 2 may conveniently be adapted, which consists of a worm wheel $I^2$, mounted upon the end of the pinion C, driven by a worm operated by a handle I, and in order to indicate the rate of change at the instrument a pointer and scale device $G^1$ $G^2$ may be provided, for example, by mounting a scale $G^1$ upon the pinion rod C and providing a pointer $G^2$ attached to the frame of the instrument, and as an example of means by which the rate of change of range, or angle $\varphi$ which is approximately proportional to the rate of change of range, may be transmitted to any desired place, the spindle of the handle I is geared to a transmitter J, which is connected to a distant receiver $J^1$. There may also be embodied in or connected with the transmitter J indicators to show the rate of change of range at the instrument itself. In place of a rod, or in addition thereto, we may employ a reflecting mirror H, as shown in the example at Fig. 3, mounted about an axis passing through the point of the pencil and perpendicular to the axis of the drum. This mirror may be rotated by mechanism (similar to that mentioned for the rotation of the rod G) until the reflection of the wavy line appears to have the same general trend as that of the wavy line itself, and not as shown in Fig. 4, which may be taken to represent the position of affairs before the operator has moved the handle I.

An example of means for indicating the rate of change of range is shown at Fig. 5, in which an arm is provided pivotally attached to the range nut N, and carrying a narrow roller K acting as a trailer, this trailer being arranged so as to be pressed on the revolving drum A thus, e. g., we shall assume that the pivoted arm has a forked end in which fork the narrow roller K is mounted with its axis horizontal and perpendicular to the length of the arm, and that the drum is so placed that the roller rests upon its upper surface. If then the arm is in a plane perpendicular to the axis of the drum, the rotation of the drum will not tend to produce any displacement of the arm; if, on the other hand, the arm is inclined to this plane the rotation of the drum will cause the arm gradually to return to the perpendicular. The length of the arm of this trailer or deviation indicator is immaterial, provided the range is increasing, or diminishing, at a uniform rate, e. g., provided the rate of change of range is constant, but the shorter this arm the quicker will be the response to a change in the rate of change of range. If the ranges were all free from errors of observation this arm might theoretically be very short, but by using a longer arm we are able to secure that the position of the arm carrying the trailer will take up an average position, so as to indicate by its angular position, relatively to the axis of the drum, an average value of the rate of change of range taken over a longer or shorter time.

In order to conveniently gage the line of direction assumed by the rod, mirror, or trailer, a follower may be provided having a mark adapted to be brought into coincidence with an intersection of the line of direction and a line at a distance from and parallel with the axis along which the nut is transversely adjusted. For example, as shown at Fig. 5, a follower M may be mounted upon a screw $S^1$, by rotating which by means of a handle $S^5$ the follower may be brought into coincidence with a rearward prolongation indicating the line of direction of the rod, mirror, or trailer, the transverse displacement of M relatively to N being a measure of the rate of change of range, a mode of indicating which is described with reference to Fig. 7. Fig. 6 shows another method of indicating the rate of change. A scale $N^1$ is mounted upon the nut N and a pointer attached to the rod, mirror, or trailer, indicates upon this scale the rate of change in a manner indicated for ranges in the figure.

Mechanism will now be described for causing the follower to automatically take up the appropriate position with reference to the line of direction assumed by the rod, mirror, or trailer, and it will be convenient to select for description an example of mechanism comprising a trailer as shown at Fig. 7. In this form of mechanism the range, as observed, is transmitted to the range screw S, say, by a receiver $J^2$, and the trailer is furnished with a rearward prolongation comprising two prongs, one above the level of the other, as shown in elevation at $K^1$ $K^2$, Fig. 8, and in plan in Fig. 9. The prongs $K^1$ $K^2$ are shown in the position of equilibrium in Fig. 9, very nearly touching the pins $L^1$ $L^2$, which may be placed in line with one another, as seen in Fig. 8, and are indicated in plan in Fig. 9 by $L^1$. If now the nut N advances, owing to the rotation of S, the trailer lags behind, and one or other of the contacts $K^1$ $L^1$ or $K^2$ $L^2$ (Figs. 8 and 9) will be made, so that if S is suitably insulated and is connected to (say) the + end of a source of E. M. F. a current will flow through one of the contacts (say, $K^1$ $L^1$) and this current may flow through the screw $S^1$ to control a mechanism for moving the stage M in such a direction as to break the contact $K^1$ $L^1$. If, on the other hand, the nut moves in the opposite sense, the trailer will lag behind on the reverse side, and the second contact $K^2$ $L^2$ will be made instead $K^1$ $L^1$. The current may now be arranged to flow through the screw $S^2$ to control the mechanism for moving the stage M in such a direction as to break the contact $K^2$ $L^2$. This "following" mechanism is represented on the right hand side of Fig. 7, and consists of a motor O, which drives by a worm, the wheel P, which is geared to the wheel 1 of the differential gear 1, 2, 3, in which 2 is the floating element connected to a fly 4. $1^1$, $2^1$, $3^1$, represent a second differential gear, 1 being geared directly to $1^1$, 3 to $3^1$ through an idle wheel 5, and $2^1$ being connected to a fly $4^1$. The wheels 1, 3, $1^1$, $3^1$, each consist of a spur wheel and a bevel wheel fixed together. When neither of the contacts $K^1$ $L^1$ or $K^2$ $L^2$ is made we may suppose the flies 4 and $4^1$ are free. If, however, contact is made, say, at $K^1$ $L^1$, we shall suppose the electro-magnet $Q^1$ is magnetized, its armature is attracted and the fly 4 is stopped. The action now is as follows:—
The spur wheel 1 transmits motion to $1^1$, and thus through $2^1$ to the fly $4^1$, but the wheel 2 being stopped the motion of 1 is communicated to 3 and through the idle wheel 5 to $3^1$ from which it may be seen that if 4 is stopped $3^1$ rotates in the opposite sense to 1. If now the contact $K^2$ $L^2$ is made instead of $K^1$ $L^1$ the fly $4^1$ is stopped and therefore the bevel wheel $2^1$, so that the motion of 1 is communicated through $1^1$ and $2^1$ to $3^1$ in such a fashion as to produce a rotation of $3^1$ in the same sense as 1. Gearing into $3^1$ is a spur wheel 6 into which a spur wheel $6^1$ of equal diameter gears, the wheels 6 and $6^1$ being fixed on the parallel screws $S^1$ and $S^2$, one of which is right handed, and the other left handed.

The stage M is supported by right and left handed nuts upon the right and left handed screws $S^1$ $S^2$ respectively. Thus if the fly 4 is stopped M will be moved in one direction, whereas if the fly $4^1$ is stopped it will be moved in the opposite direction and in its position of equilibrium the contacts at $K^1$ $L^1$ and $K^2$ $L^2$ will be broken and both the flies 4 and $4^1$ will be running freely. Thus if the trailer takes up any position with reference to the drum, the double-pronged elongation $K^1$ $K^2$ Figs. 7, 8 and 9, makes a contact, and the "following" mechanism almost at once is automatically moved so as to break this contact. In this way the differential rotation of the two screws S and $S^1$ is a true measure of tan. φ and is therefore a true measure of the rate of change of range. We show the stage M as controlled by the motion of two screws $S^1$ and $S^2$ but it is to be understood that one screw is sufficient provided M be suitably guided otherwise. To indicate this rate of change we may therefore provide a differential gear, Fig. 7, in which one element, 7, is operated by the rotation of S, the other element, 9, by the rotation of $S^1$, while the floating element, 8, to which a pointer R is fixed, indicates by its position with reference to a fixed scale, T, what is the rate of change of range. In this illustration 7 and 9 each represent two bevel wheels fixed back to back. If we require to indicate the result at a distance we may gear the floating element 8 to a transmitter operating a distant receiver just as in the case illustrated by Fig. 2. As indicated in Fig. 5 a like method of indicating the rate of change can be used when the member M is moved by hand as above described. The drum A controlled by a centrifugal, or other governor, may also be driven by the motor O.

This apparatus may be modified in several ways, e. g., the "following" mechanism may be arranged so that the motor drives the floating element 2 while $2^1$ operates the screw $S^1$. In this case one fly will be arranged to prevent the motion of 1 and $1^1$, while the second fly will prevent the motion of 3 and 3¹. We can, however, arrange that the "following" mechanism is operated by one contact instead of two. In this case when both the wheels 3 and 3¹ are free we may arrange that the frictional resistance to the motion of one (say 3¹) is considerably greater than that for the other. When both wheels are free the "following" mechanism will be arranged to cause the pins which form the contact to approach. During contact the faster moving wheel 3 is stopped and the mechanism operates to remove the pins from contact. Other forms of differential gear may also be used, not only in connection with the "following" mechanism to the right of the figure, but also to replace the gear between S and S¹ to the left of the figure. Again, instead of controlling the motion of the "following" mechanism by the making of one or other of two contacts, we may effect the same purpose by breaking instead of making such contacts.

It will be recognized that the mechanism is capable of modification, for example, the relative transverse motion to be imparted between the member and the traveling surface can be obtained by traversing the drum A transversely while the nut N remains stationary. Further, it is not always necessary to determine the rate of change relative to some initial value of the variable quantity, for example, especially for gaging the rate of change of bearing, the initial setting of the instrument may be disregarded, and the rate of change merely determined; in the same way rate of change of range may be indicated and the positions along the drum need have no fixed relationship to range. Further, instead of using a drum any suitable form of traveling surface may be adopted, for example, a traveling band presenting a flat or convex surface. In cases, however, where we desire to predict the probable value of the range for a definite period ahead, which depends upon the range, we may introduce means for producing the required modification of the indication of range. This may be done by introducing means for coöperation with the mechanism by which rate of change is indicated, for example, the required indication may be obtained by varying the positions along the line of direction at which the follower takes up its positions of equilibrium. In one form of construction this may be done by means of a curved guide, an example of the embodiment of which will now be described with reference to Figs. 10 to 12.

Fig. 10 shows diagrammatically the idea underlying this method of range prediction. S is the range screw and K the trailer. The two contacts L¹ L² are in this figure represented for clearness as one to the right and the other to the left of the prolongation of the trailer, though a better actual arrangement is shown in Figs. 8 and 9. These contacts are carried on the stage W which can slide perpendicularly to the axis of the screw S¹, which screw we shall call the "predicted range" screw.

The position of W in its slide is determined by the form of the curved guide V against which W is forced by a spring (not shown) or we may conceive V to be a curved groove in which engages a pin rigidly attached to W. If, as shown in Fig. 10, the range is increasing and the "following" mechanism already described is operating S¹ then the position of instantaneous equilibrium of W will be such that both contacts at L¹ and L² are broken, so that if we had a scale of ranges along the screw S¹ exactly corresponding to that along S (as shown in the figure for a portion of the scale) the indication of M upon the screw S¹ will be higher than that of N upon the screw S.

The position of M with reference to its screw S¹ can be indicated as will be explained in discussing Fig. 13. The difference between the ranges, as given by N upon S (the observed range) and that given by M upon S¹ (the predicted range) depends upon the angle φ of the trailer and the form and position of the curved guide V. In the first instance we shall suppose that the horizontal component of the velocity of the shot is uniform whatever the range, in which case the guide V should be straight, as shown by the dotted line, and should be so placed (as indicated in Fig. 11) that the locus of the positions of the pins L¹ L², Fig. 10, shall be a straight line S³ intersecting the line S⁴ at the place corresponding to zero range where S⁴ represents the line of motion of the center on the nut N about which the trailer (or its equivalent) rotates. The angle Θ between S³ and S⁴ depends upon the ratio of the peripheral velocity of the surface of the drum, $v$, to the muzzle velocity of the shot $v^1$, as measured on the scale of the screw S. In what follows we assume that Θ is small so that Θ, sin. Θ and tan. Θ may be taken as equal. Referring to Fig. 11 the numbers along the line S⁴ (which represent the observed ranges) and the line S³ (which represent the predicted ranges) correspond to thousands of yards. From the figure it will be seen that $$\frac{dr}{r} = \tan. \varphi \text{ and } \frac{r}{R+dR} = \tan. \Theta,$$

therefore, approximately $dR = R.\Theta.\varphi.$; but $$\Theta = \frac{v}{v^1}, \text{ and } \varphi = \frac{u}{v}$$

where $u$ is the rate of change of range, as represented on the scale of the instrument thus, $$dR = R\frac{u}{v^1},$$

or the additional range is proportional to the range, the rate of change of range, and inversely proportional to the muzzle velocity which is approximately what is required. When, however, we wish to allow for the diminution in muzzle velocity of the shot in its course the guide V may be suitably curved as indicated by the full line in Fig. 11, in which case the line $S^3$ would also be curved.

Fig. 12 shows diagrammatically a modification of the arrangement. Instead of mounting the stage M upon a screw placed parallel to the screw S as shown in Figs. 7 and 10, in which case the motion of the slider W relatively to M will be considerable, we may conveniently arrange the screws $S^1$ $S^2$ as in Fig. 12, inclined at the angle $\Theta$ to S, by which means the motion of the slider is reduced merely to that required to allow for the diminution in average velocity with increasing range. As the stage M is moved by the screws $S^1$ $S^2$, W slides upon M, its position relatively to M being governed by the curved guide V against which W is pressed by a spring X, (shown in Fig. 14) thus the locus of the contacts U instead of being a line parallel to $S^1$ is curved as shown by the dotted line. In this way it is clear that the additional range to be added (or subtracted) from the observed ranges can be made to suit any particular type of gun by suitably forming and placing the curved guide V.

Fig. 13 shows in plan and Fig. 14 in transverse section through the stage M, slider W and trailer K the complete range predictor. On the extreme left is shown the range, viz., 6000 yards furnished to the instrument through the receiver $J^2$. From the position of the trailer it is seen that the range is diminishing since N is moving to the left. The prolongation of the trailer will thus be keeping one of the contacts at U made (or broken). This action effects the stoppage of one of the flies, say, 4 so that the motor O is driving M to the left. One of the screws $S^1$ $S^2$ is geared to a transmitter Y where the predicted range, viz., 5700 yards may be read off or when desired the predicted range may be indicated on a distant receiver Z, or in certain cases where the range predictor is near the gun, the gun sight may itself be operated (through a suitably constructed cam) by the wheel $6^1$ Fig. 13.

In Figs. 8 and 14 are shown two drums A and $A^1$ and two trailers K and $K^3$. The two drums rotate in opposite directions, and are suitably geared for that purpose. The object of this arrangement is to keep the trailer continuously in contact with the surface of the drum when the instrument is subject to severe vibration or shock.

It will be recognized that the mechanism for indicating the rate of change of range at determined ranges may be otherwise modified to produce the required predictions, for example, instead of using a surface of which all parts travel at the same rate, a surface may be generated to vary from a regular rate in conformity with the variable factor, for example, in the case of a drum it may be formed of variable diameter.

We have assumed above that the motion of the range nut upon the range screw is the same for equal alterations in range. In the case of a constant base rangefinder the scale is a reciprocal one, and if the working head of the rangefinder be geared mechanically, or electrically to the range screw S so that equal motions of the working head produce equal motions of the range screw, we should get the equivalent of a range screw adapted for a reciprocal scale of ranges. The form of the curved guide will now have to be modified to suit the altered nature of the range scale. The "following" mechanism will now be geared so as to actuate a pointer with reference to a reciprocal scale or vice versa.

If instead of transmitting ranges we transmit the compass bearings of a target, the instrument can be arranged to indicate or to transmit rate of changes of bearing (i. e. the correction for deflection) in the manner described in discussing the indication or transmission of rate of change of range. The instrument can also be used for other like purposes.

We claim:—

1. A traveling surface moving at a uniform rate normally in one direction, a member, means for imparting a relative motion between the member and the traveling surface transversely to the normal direction of motion of the traveling surface, in combination with means pivotally mounted upon the member and capable of angular movement in conformity with the angular deviation from the said normal direction of motion indicating the ratio of the normal velocity of the traveling surface and the relative transverse velocity, for the purposes set forth.

2. A traveling surface moving at a uniform rate in one direction, a member, means for moving the member transversely to the direction of motion of the traveling surface, in combination with means pivotally mounted upon the member and capable of angular movement in conformity with the angular deviation which may occur in the movements between the member and the traveling surface indicating the ratio of the velocity of the traveling surface and the transverse velocity of the member, for the purposes set forth.

3. A revolving drum presenting a traveling surface moving at a uniform rate normally in one direction, a member, means for imparting a relative motion between the member and the drum transversely to the normal direction of motion of the surface of the drum, in combination with means pivotally mounted upon the member and capable of angular movement in conformity with the angular deviation from the said normal direction of motion indicating the ratio of the normal velocity of the surface of the drum and the relative transverse velocity of the member, for the purposes set forth.

4. A revolving drum presenting a traveling surface moving at a uniform rate in one direction, a member, means for moving the member transversely to the direction of motion of the traveling surface, in combination with means pivotally mounted upon the member and capable of angular movement in conformity with the angular deviation which may occur in the movements between the member and the traveling surface for indicating the ratio of the velocity of the traveling surface of the drum and the relative transverse velocity of the member, for the purposes set forth.

5. A traveling surface moving at a uniform rate normally in one direction, a member, means for imparting a relative motion between the member and the traveling surface transversely to the normal direction of motion of the traveling surface, in combination with an arm pivotally mounted upon the member and furnished at its end with a trailer arranged to bear upon the traveling surface, the arm being free to turn about its pivot, for the purposes set forth.

6. A traveling surface moving at a uniform rate in one direction, a member, means for moving the member transversely to the direction of motion of the traveling surface, in combination with an arm pivotally mounted upon the member and furnished at its end with a trailer arranged to bear upon the traveling surface, the arm being free to turn about its pivot, for the purposes set forth.

7. A traveling surface moving at a uniform rate in one direction, a screw set parallel to the traveling surface and perpendicular to the direction of motion of the traveling surface, a member mounted upon the screw, in combination with means pivotally mounted upon the member and capable of angular movement indicating the ratio of the velocity of the traveling surface and the transverse velocity imparted by the screw to the member, for the purposes set forth.

8. A traveling surface moving at a uniform rate in one direction, a screw set parallel to the traveling surface and perpendicular to the direction of motion of the traveling surface, a member mounted upon the screw, in combination with an arm pivotally mounted upon the member and furnished at its end with a trailer arranged to bear upon the traveling surface, the arm being free to turn about its pivot, for the purposes set forth.

9. A traveling surface moving at a uniform rate normally in one direction, a member, means for imparting a relative motion between the member and the traveling surface transversely to the normal direction of motion of the traveling surface, means pivotally mounted on the member and capable of angular movement in conformity with the angular deviation from the said normal direction of motion for indicating the ratio of the normal velocity of the traveling surface and the relative transverse velocity, in combination with a scale from which the angular position of the means indicating the said ratio may be read off, for the purposes set forth.

10. A traveling surface moving at a uniform rate in one direction, a member, means for moving the member transversely to the direction of motion of the traveling surface, an indicator mounted on the member for indicating the ratio of the velocity of the traveling surface and the transverse velocity of the member, a prolongation from the indicator, a follower adapted to be moved along a line at a distance from the line of transverse motion of the member and brought into coincidence with the prolongation, for the purposes set forth.

11. A traveling surface moving at a uniform rate in one direction, a member, means for moving the member transversely to the direction of motion of the traveling surface, a trailer mounted on the member and arranged to bear upon the traveling surface, a prolongation from the trailer, a follower set and adapted to be moved along a line at a distance from the line of transverse motion of the member, and to be brought into coincidence with the prolongation, for the purposes set forth.

12. A traveling surface moving at a uniform rate in one direction, a member, means for moving the member transversely to the direction of motion of the traveling surface, in combination with an indicator mounted on the member for indicating the ratio of the velocity of the traveling surface and the transverse velocity of the member, a prolongation from the indicator, a follower adapted to be moved along a line at a distance from the line of transverse motion of the member, electrical contact means on the follower, mechanism brought into operation by contact action between the prolongation and the contact means for moving and for automatically maintaining the follower in a position of coincidence with the prolongation, for the purposes set forth.

13. A traveling surface moving at a uniform rate in one direction, a member, means for moving the member transversely to the direction of motion of the traveling surface, a trailer mounted on the member and arranged to bear upon the traveling surface, a prolongation from the trailer, a follower set and adapted to be moved along a line at a distance from the line of transverse motion of the member, electrical contact means on the follower, mechanism for moving the follower, brought into operation by contact action between the prolongation and the contact means, for automatically maintaining the follower in a position of coincidence with the prolongation, for the purposes set forth.

14. A traveling surface moving at a uniform rate in one direction, a member, means for moving the member transversely to the direction of motion of the traveling surface, in combination with an indicator for indicating the ratio of the volocity of the traveling surface and the transverse velocity of the member, a prolongation from the indicator, a follower set and adapted to be moved along a line at a distance from the line of transverse motion of the member and to be brought into coincidence with the prolongation, associated with means for indicating the transverse displacement of the follower relative to the member, for the purposes set forth.

15. A traveling surface moving at a uniform rate in one direction, a leading screw set parallel to the traveling surface and perpendicular to the direction of motion of the traveling surface, a member mounted on the leading screw, an indicator mounted on the member for indicating the ratio of the velocity of the traveling surface and the transverse velocity adapted to be imparted by the leading screw to the member, a subsidiary screw set at a distance from the leading screw, a follower mounted upon the subsidiary screw, means for rotating the subsidiary screw for moving the follower into coincidence with the line of direction taken up by the indicator, associated with differential gearing, intervening between the leading screw and the subsidiary screw, having a floating element by which an indicator is operated, for the purposes set forth.

16. A traveling surface moving at a uniform rate in one direction, a part having a line representing a scale of determined ranges, a member arranged to be moved along the line of determined ranges, an indicator mounted on the member for indicating the ratio of the velocity of the traveling surface and the velocity of the member along the line of determined ranges, a part having a line representing a scale of predicted ranges, set at a distance from the line of determined ranges, a follower adapted to be moved along the line of predicted ranges and brought into coincidence with the line of direction taken up by the indicator at variable positions along the said line of direction, for the purposes set forth.

17. A traveling surface moving at a uniform rate in one direction, a leading screw, representing a scale of determined ranges, set parallel to the traveling surface and perpendicular to the direction of motion of the traveling surface, a member mounted on the leading screw, an indicator mounted on the member for indicating the ratio of the velocity of the traveling surface and the velocity adapted to be imparted by the leading screw to the member, a part having a line, representing a scale of predicted ranges, set at a distance from the determined range screw, a follower adapted to be moved along the line of predicted ranges, means for moving the follower into coincidence with the line of direction taken up by the indicator, and means for varying the positions of coincidence along the said line of direction, for the purposes set forth.

18. A traveling surface moving at a uniform rate in one direction, a leading screw, representing a scale of determined ranges, set parallel to the traveling surface and perpendicular to the direction of motion of the traveling surface, a member mounted on the leading screw, an indicator mounted on the member for indicating the ratio of the velocity of the traveling surface and the velocity adapted to be imparted by the leading screw to the member, a subsidiary screw, representing a scale of predicted ranges, set at a distance from the leading screw, a follower mounted on the subsidiary screw, means for rotating the subsidiary screw for moving the follower into coincidence with the line of direction taken up by the indicator, and means for varying the positions of coincidence along the said line of direction, for the purposes set forth.

ARCHIBALD BARR.
WILLIAM STROUD.

Witnesses:
OLIVER HAYWARD POTTER,
ARLINE DAVIES.

---

Copies of this patent may be obtained for five cents each, by addressing the "Commissioner of Patents, Washington, D. C."